United States Patent [19]

Ito

[11] Patent Number: 5,175,931
[45] Date of Patent: Jan. 5, 1993

[54] ANGULAR BALL BEARING AND METHOD FOR ASSEMBLING THE SAME

[75] Inventor: Yukifusa Ito, Kaizu, Japan

[73] Assignee: NTN Corporation, Nishi, Japan

[21] Appl. No.: 693,474

[22] Filed: Apr. 30, 1991

Related U.S. Application Data

[62] Division of Ser. No. 493,161, Mar. 14, 1990, Pat. No. 5,026,179.

[30] Foreign Application Priority Data

Mar. 17, 1989 [JP] Japan ................... 1-66798

[51] Int. Cl.$^5$ .............................. B23P 17/00
[52] U.S. Cl. .................. 29/898.061; 29/898.064; 29/423
[58] Field of Search .............. 29/898.061, 898.062, 29/898.064, 898.09, 418, 423, 464, 559, 281.1; 384/523, 526, 527, 580, 528

[56] References Cited

U.S. PATENT DOCUMENTS

| | | | |
|---|---|---|---|
| 3,486,212 | 12/1969 | Vannest | 384/523 |
| 4,508,397 | 4/1985 | Hofmann et al. | 29/898.061 X |
| 4,702,627 | 10/1987 | Pollastro | 384/526 |
| 4,838,712 | 6/1989 | Kubo et al. | 384/523 |
| 5,046,229 | 10/1991 | Ledermann | 29/898.061 |

Primary Examiner—Joseph M. Gorski
Assistant Examiner—S. Thomas Hughes
Attorney, Agent, or Firm—Nikaido, Marmelstein, Murray & Oram

[57] ABSTRACT

An angular ball bearing having an outer ring, a cage mounted in the outer ring and formed at equal circumferential intervals with pockets and balls received in the pockets, and an inner ring mounted in the cage. The cage is formed on the surface of the pockets with projections to prevent the balls from coming out of the pockets. When the balls are in abutment with the projections, the diameter of the circumscribed circle of the balls is equal to or smaller than the internal diameter of the outer ring.

To assemble the angular ball bearing, the balls are set in the pockets in the cage, a resilient member having substantially the same external diameter as that of the inner ring and the resilient member is pushed out with the inner ring in an axial direction to fit the inner ring inside the balls.

1 Claim, 1 Drawing Sheet

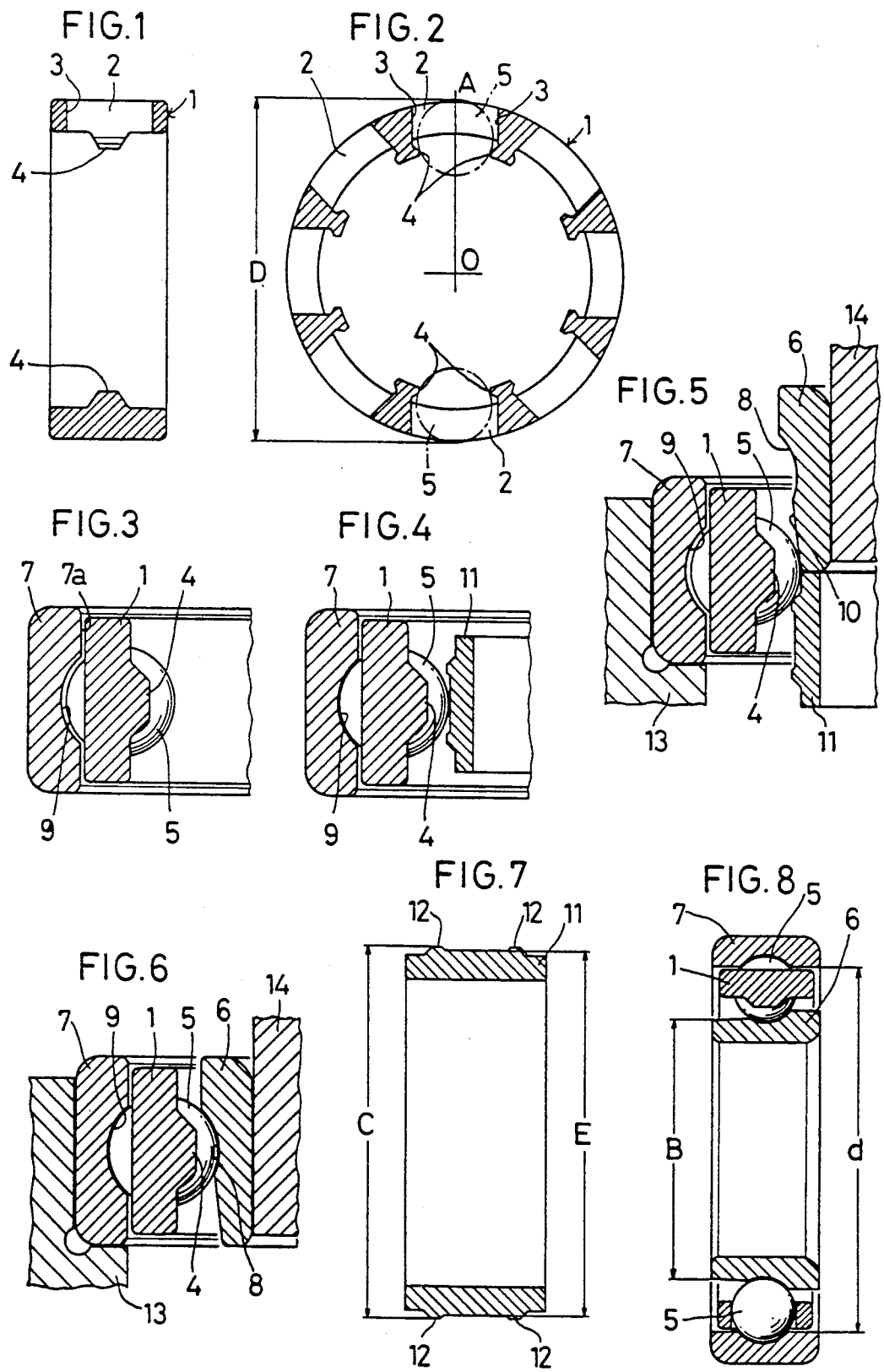

ANGULAR BALL BEARING AND METHOD FOR ASSEMBLING THE SAME

This is a division of application Ser. No. 493,161 filed Mar. 14, 1990, now U.S. Pat. No. 5,026,179.

This invention relates to an angular ball bearing and a method for assembling the same.

In assembling a prior art angular ball bearing of the type in which an inner ring is separate, a cage having pockets for receiving balls is fitted in an outer ring, the balls are inserted in the pockets from inside of the cage and the inner ring is mounted inside the balls.

There is known a prior art cage which is integrally formed of synthetic resin so that balls can be mounted easily therein. It is formed on the inner surface of its pockets with protrusions to prevent the balls from coming out.

But if an angular ball bearing having a cage made of resin is rotated at a high speed, the cage tends to be deformed at portions where it is in contact with the outer ring and the balls owing to a rise in temperature in the bearing. This will lower the strength of the cage.

Thus many prior art bearings adapted to be rotated at high speed use a cage made by integrally cutting a metallic material such as a copper alloy. But since a cage made by cutting a metallic material is scarcely liable to elastic deformation, it is extremely difficult to insert balls in the cage from the inside thereof. If balls are thrust into the pockets by force, the balls may be damaged on their surface owing to metal-to-metal abrasion. The balls thus damaged will not only hinder smooth rotation of the bearing but also shorten its life.

Further, with such a prior art cage, it was difficult to control the size and shape of the protrusions formed on the surface of the pockets. Thus they were likely to get into contact with the balls guided between the outer ring and the inner ring. The contact between the protrusions and the balls tends to act as a large resistance to the movement of the balls, thus hindering smooth rotation of the balls. Also this tends to cause an oil film on the surface of the balls to be wiped away at their areas of contact and thus cause the seizure of the balls.

It is an object of the present invention to provide an angular ball bearing which meets the requirements necessary for a cage made by cutting a metal, namely the requirement that the balls can be set in the pockets from inside the cage without thrusting them by force and the requirement that the projections in the pockets are kept out of contact with the balls being guided between the outer ring and the inner ring.

It is another object of the present invention to provide a method for stably fitting balls and an inner ring in an outer ring by use of the above-described cage to assemble a bearing.

In accordance with the present invention, there is provided an angular ball bearing comprising an outer ring, a cage mounted in the outer ring and formed at equal circumferential intervals with pockets, an inner ring mounted in the cage, the cage having an outer peripheral surface guided by the outer ring, and balls received in the pockets, the cage being formed on the inner surface of the pockets with projections to prevent the balls from coming out of the pockets, the diameter of the circumscribed circle of the balls being equal to or smaller than the internal diameter of the outer ring when the balls are in abutment with the projections.

Since the circumscribed circle of the balls received in the pockets in the cage has a diameter equal to or smaller than the internal diameter of the outer ring, the cage can be fitted in the outer ring with the balls received therein.

While the balls are being guided between the outer ring and the inner ring, they are fitted in a large-diameter ball rolling surface formed on the inner peripheral surface of the outer ring and the cage is guided along the inner peripheral surface of the outer ring. As a result, gaps are formed between the projections in the pockets and the balls. In other words, they are kept out of contact with each other.

Because the circumscribed circle of the balls set in the pockets in the cage has a diameter equal to or smaller than the internal diameter of the outer ring, there is a fear that the balls may come off the outer ring after setting them in the outer ring. To prevent this, in assembling the bearing by use of the above-described cage, a resilient member is fitted inside the balls set in the outer ring so that the balls will be fitted in the ball rolling surface on the outer ring by its elasticity. Thus the balls are prevented from getting loose. Then the resilient member is pushed out by the inner ring so that the inner ring can be inserted inside the balls continuously.

With the angular ball bearing assembled by use of the cage according to the present invention and according to the above-described method, the balls can be set in the pockets without the fear of getting damaged. Also, the bearing will exhibit an excellent rotating performance and a long life because the balls are kept out of contact with the projections in the pockets while in rotation.

Other features and objects of the present invention will become apparent from the following description taken with reference to the accompanying drawings, in which:

FIG. 1 is a vertical sectional side view of the cage of the embodiment of the present invention;

FIG. 2 is a vertical sectional front view of the same;

FIG. 3 to 6 are views showing how the bearing according to the present invention is assembled;

FIG. 7 is a vertical sectional side view of the resilient sleeve; and

FIG. 8 is a vertical sectional side view of the angular ball bearing according to the present invention.

Now the embodiments of this invention will be described with reference to the accompanying drawings.

As shown in FIGS. 1 and 2, a cage 1 according to the this invention is integrally formed by cutting a metallic material such as a copper alloy and is formed with pockets 2 arranged at circumferentially equal intervals to receive balls 5.

Each pocket 2 has its inner wall surface 3 cylindrically shaped so as to be parallel to its center line OA. Opposite projections 4 are formed on the inner surface 3 of each pocket at its inner end portion to prevent the balls from coming out.

As shown in FIG. 2, the projections 4 in the pockets 2 are arranged so that when the balls 5 abut the projections 4, the diameter D of the circumscribed circle of the balls will be equal to or slightly smaller than the internal diameter d (FIG. 8) of an outer ring 7. Also, D may be larger than the internal diameter d of the outer ring as far as the elastic deformation of the projections 4 permits.

The cage 1 has an external diameter slightly smaller than the internal diameter d of the outer ring 7 so that when the ball bearing is assembled, the cage 1 will be guided along an inner peripheral surface 7a (FIG. 3) of the outer ring 7 by contact between its outer peripheral surface and the inner peripheral surface 7a.

As shown in FIGS. 5 and 8, the outer ring 7 is formed on its inner peripheral surface at its central portion with a ball rolling surface 9 having a larger diameter than the inner peripheral surface 7a. The inner ring 6 mounted in the outer ring 7 is formed on its outer peripheral surface with a ball rolling surface 8 and a cylindrical surface 10 having a larger external diameter than the diameter of the inscribed circle of the balls 5. The balls are held between the ball rolling surfaces 8 and 9 formed on the outer ring 7 and the inner ring 6, respectively.

With the cage 1 having the above-described structure, when the balls 5 abut the projections 4 formed inside the pockets 2, the diameter of the circumscribed circle of the balls 5 is smaller than the internal diameter of the outer ring 7. Thus it can be fitted in the outer ring 7 without difficulty.

When the balls 5 are held between the ball rolling surfaces 8 and 9 on the outer ring 7 and the inner ring 6, the balls 5 are fitted in the ball rolling surface 9 on the outer ring 7 whereas the cage 1 is guided along the inner peripheral surface 7a of the outer ring 7. Thus the balls 5 and the projections 4 are kept out of contact with each other.

FIGS. 3 to 6 show how the angular ball bearing is assembled by use of the above-described cage 1.

In assembling the ball bearing, the cage 1 having the balls 5 received in its pockets 2 is fitted in the outer ring 7 as shown in FIG. 3. In this state, the diameter D of the circumscribed circle of the balls 5 is equal to or smaller than the internal diameter d of the outer ring 7. Thus the balls 5 might come off the outer ring 7. In order to prevent this, a resilient sleeve 11 is fitted inside the balls 5 as shown in FIG. 4.

As shown in FIG. 7, this resilient sleeve 11 has an external diameter substantially equal to the external diameter B of the inner ring 6. By fitting this resilient sleeve 11, the balls 5 are pressed against the ball rolling surface 9 on the outer ring 7 and held in this position.

The sleeve 11 is formed on the outer periphery thereof at both ends with projections 12 to restrict the axial movement of the balls 5. They have an external diameter C larger than the diameter of the inscribed circle of the balls.

After setting the cage 1 with the balls 5 and the resilient sleeve 11 in the outer ring 7, the assembly is mounted in a shaft case 13 as shown in FIG. 5. Then the inner ring 6 mounted on a shaft 14 is lowered from above with the axis of the outer ring 7 extending vertically to push the resilient sleeve 11 by the end face thereof and drop it so that the inner ring 6 can be inserted inside the balls 5.

In this case, since the balls 5 are pressed against the ball rolling surface 9 on the outer ring 7 by the elasticity of the sleeve 11, the inner ring 6 can be fitted inside the balls without the fear of the balls coming out. (FIG. 6)

The resilient sleeve 11 should be made of a material which is less liable to damage the balls while assembling the bearing. Such a material includes a synthetic resin such as polyethylene.

If there is no fear that the resilient sleeve 11 may damage the balls and the outer ring when inserting it, it should have a larger external diameter E than the diameter of the inscribed circle of the balls to increase its elasticity. If there is such fear, its external diameter E should be smaller than the diameter of the inscribed circle of the balls to facilitate insertion of the sleeve.

The resilient member adapted to be inserted inside the balls may not be in the form of a sleeve but may be in the form of a solid round bar made of rubber.

What is claimed is:

1. A method for assembling an angular ball bearing having an outer ring, a cage mounted in said outer ring and formed at equal circumferential intervals with pockets, an inner ring mounted in said cage, said cage having an outer peripheral surface guided by said outer ring, and balls received in said pockets, said cage being formed on the inner surface of said pockets with projections to prevent said balls from coming out of said pockets, the diameter of the circumscribed circle of said balls being equal to or smaller than the internal diameter of said outer ring when said balls are in abutment contact with said projections, comprising the steps of setting balls in said pockets in said cage, placing the cage in the outer ring, fitting inside said balls a resilient member having substantially the same external diameter of said inner ring and pushing out said resilient member in an axial direction with said inner ring and thereby fitting said inner ring inside said balls.

* * * * *